United States Patent
Patel et al.

(10) Patent No.: US 12,505,008 B2
(45) Date of Patent: Dec. 23, 2025

(54) DATA STORAGE DEVICE RECOVERY ON UNCORRECTABLE READ FAILURE

(71) Applicant: SanDisk Technologies LLC, Addison, TX (US)

(72) Inventors: Karan Patel, Bangalore (IN); Amit Chopra, Bangalore (IN); Nitin Jain, Bangalore (IN)

(73) Assignee: SanDisk Technologies LLC, Addison, TX (US)

( * ) Notice: Subject to any disclaimer, the term of this patent is extended or adjusted under 35 U.S.C. 154(b) by 35 days.

(21) Appl. No.: 18/422,035

(22) Filed: Jan. 25, 2024

(65) Prior Publication Data

US 2025/0245093 A1 Jul. 31, 2025

(51) Int. Cl.
*G06F 11/00* (2006.01)
*G06F 11/07* (2006.01)

(52) U.S. Cl.
CPC ........ *G06F 11/0793* (2013.01); *G06F 11/073* (2013.01)

(58) Field of Classification Search
CPC ............................ G06F 11/073; G06F 11/0793
See application file for complete search history.

(56) References Cited

U.S. PATENT DOCUMENTS

| | | | |
|---|---|---|---|
| 6,243,836 B1 * | 6/2001 | Whalen | G06F 11/267 714/39 |
| 6,425,108 B1 * | 7/2002 | Chiang | G11C 29/52 714/764 |
| 7,747,813 B2 | 6/2010 | Danilak | |
| 8,954,689 B2 | 2/2015 | Seekins | |
| 9,495,101 B2 | 11/2016 | Lieber | |
| 10,998,066 B2 | 5/2021 | Jean | |
| 11,216,195 B1 * | 1/2022 | Armangau | G06F 12/0871 |
| 2008/0082725 A1 | 4/2008 | Elhamias | |
| 2009/0049270 A1 * | 2/2009 | Khatri | G11C 29/88 711/E12.002 |
| 2016/0179618 A1 * | 6/2016 | Resch | G06F 16/184 714/764 |
| 2018/0074885 A1 * | 3/2018 | Giloni | G06F 3/0673 |
| 2019/0102251 A1 * | 4/2019 | Iyigun | G06F 11/1068 |
| 2021/0019083 A1 * | 1/2021 | Guo | G06F 11/1076 |
| 2022/0066868 A1 * | 3/2022 | Betz | G06F 11/1068 |
| 2022/0276787 A1 * | 9/2022 | Baptist | H04N 21/2181 |
| 2022/0291837 A1 * | 9/2022 | Shao | G06F 3/064 |
| 2024/0220110 A1 * | 7/2024 | Lee | G06F 3/0653 |

* cited by examiner

*Primary Examiner* — Joshua P Lottich
(74) *Attorney, Agent, or Firm* — Arlene Neal; Neal Blibo

(57) ABSTRACT

A storage device may recover from an uncorrectable read failure in a control block. The storage device includes a memory device divided into blocks. The blocks on the memory device may include control blocks for storing control information for accessing host data. A controller on the storage device may identify when an uncorrectable read failure occurs in a first control block. The controller may quarantine the first control block and notify a host device of the uncorrectable read failure. Based on a response from the host device, the controller may recover the storage device to operate in a normal mode such that a recovered storage device excludes the first control block from use.

14 Claims, 5 Drawing Sheets

DATA STORAGE DEVICE RECOVERY ON UNCORRECTABLE READ FAILURE

BACKGROUND

A storage device may be communicatively coupled to a host and to non-volatile memory including, for example, a NAND flash memory device on which the storage device may store data received from the host. The NAND flash memory may be divided into partitions which may be further divided into blocks. Data may be stored in the blocks in various formats, with the formats being defined by the number of bits that may be stored per memory cell. For example, a single-layer cell (SLC) format may write one bit of information per memory cell, a multi-layer cell (MLC) format may write two bits of information per memory cell, a triple-layer cell (TLC) format may write three bits of information per memory cell, and a quadruple-layer cell (QLC) format may write four bits of information per memory cell, and so on.

The lifespan of the storage device may vary depending on factors such as, the quality of the memory device used in the storage device, wear out management of the blocks on the memory device, thermal handling, and management of power and shutdowns, among others. The storage device may implement firmware to keep the storage device usable for as long as possible. However, when the storage device enters a state where data may no longer be written to the memory device, the storage device may enter a read-only mode. In the read-only mode, the host may be able to read data written on the memory device but may be unable to program/write data to the memory device via the storage device. When the storage device enters the read-only mode, the storage device is considered to be in an end-of-life status.

To delay the storage device from entering the end-of life status, if some of the blocks on the memory device becomes defective, a current approach reduces the storage device write capacity by removing the defective blocks. For example, if the memory device has one thousand blocks and one hundred of them are defective and cannot be written on (those blocks are also referred to herein as bad block or grown bad blocks), this approach may reduce the drive write capacity to nine-hundred blocks. Another approach allows for over provisioning of spare blocks that may be used when the storage device is nearing the end-of-life status. Over provisioning of spare blocks may result in increased cost. Another approach may use store fewer bits per memory cell than a block is designed for when the storage device is nearing the end-of-life status. For example, this approach may delay the storage device from entering the read-only mode by using TLC blocks as MLC blocks or by using MLC blocks as SLC blocks. All of these approaches may have adverse impact on the storage device's write capacity as they may reduce the write capacity of the storage device. When the storage device capacity is reduced, the reduction may be clearly visible to a user and reduction of the storage device capacity may not be an acceptable or tenable solution for the user.

In addition to entering the read-only mode when some blocks on the memory device becomes defective, the storage device may also enter the read-only mode when there is an uncorrectable read failure occurs on a control block in the memory device. The uncorrectable read failure may cause the storage device to be unable to access host data associated information stored in the control block with the uncorrectable read failure. None of the current approaches can prevent the storage device from entering the read-only mode due to such an uncorrectable read failure on a control block.

SUMMARY

In some implementations, the storage device may recover from an uncorrectable read failure in a control block. The storage device includes a memory device divided into blocks. The blocks on the memory device may include control blocks for storing control information for accessing host data. A controller on the storage device may identify when an uncorrectable read failure occurs in a first control block. The controller may quarantine the first control block and notify a host device of the uncorrectable read failure. Based on a response from the host device, the controller may recover the storage device to operate in a normal mode such that a recovered storage device excludes the first control block from use.

In some implementations, a method is provided for recovering from an uncorrectable read failure in a control block on a storage device. The method include identifying when an uncorrectable read failure occurs in a first control block on a memory device coupled to the storage device. The method also includes quarantining the first control block and notifying a host device of the uncorrectable read failure. The method further includes recovering the storage device to operate in a normal mode based on a response from the host device, wherein a recovered storage device excludes the first control block from use.

In some implementations, the storage device recovers from an uncorrectable read failure in a control block. The controller identifies when an uncorrectable read failure occurs in a first control block, quarantines the first control block, and notifies a host device of the uncorrectable read failure. The controller also formats the storage device to operate in a normal mode based on a response from the host device. A recovered storage device excludes the first control block from use. The controller further includes host data associated with control blocks that did not include the uncorrectable read failure on the recovered storage device.

Figure 1:
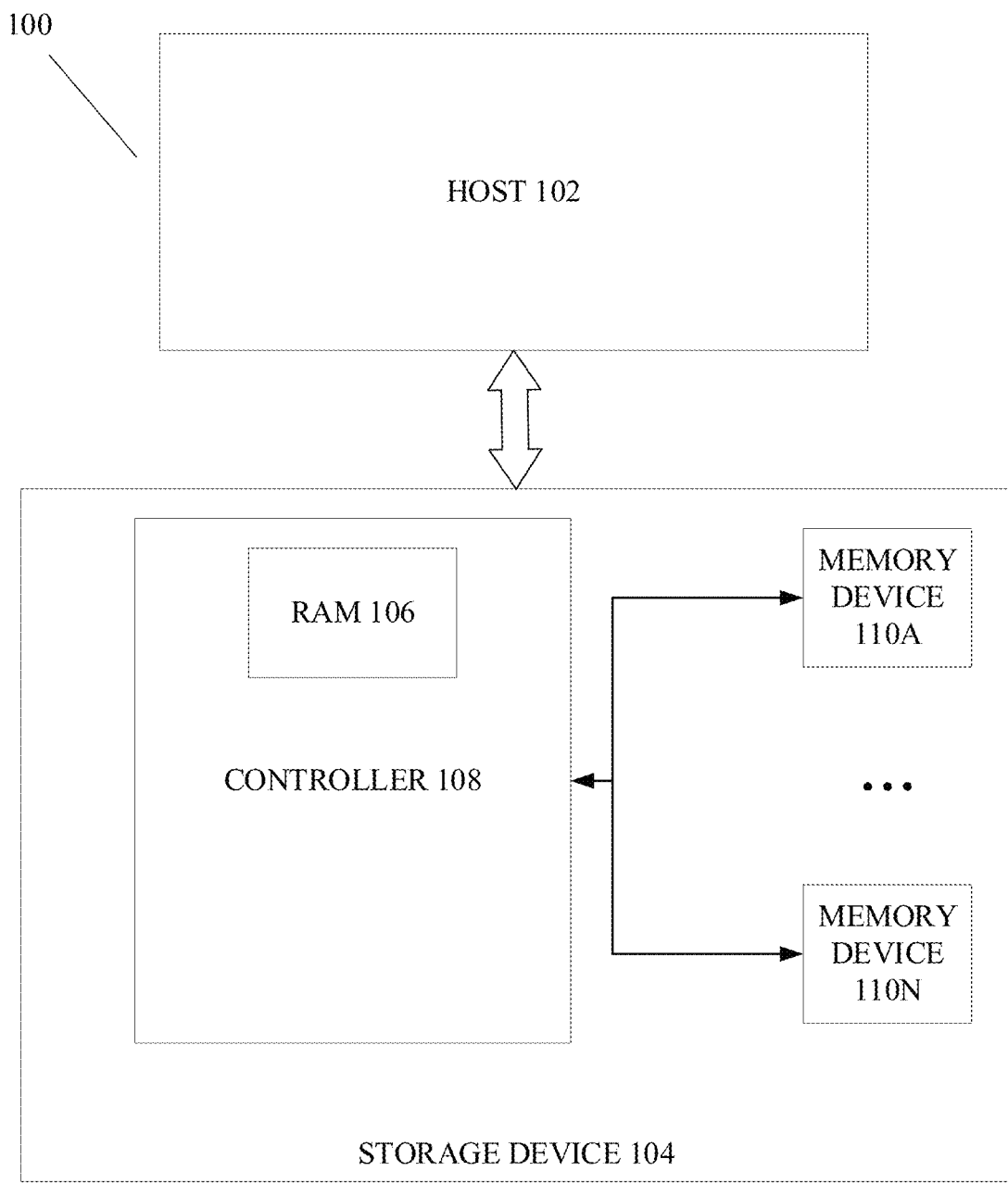
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, and one or more non-volatile memory devices 110a-110n (referred to herein as the memory device(s) 110). Storage device 104 may be, for example, a solid-state drive (SSD), and the like. RAM 106 may be temporary storage such as a dynamic RAM (DRAM) that may be used to cache information in storage device 104.

Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory that may be used for storing host and control data over the operational life of memory device 110. Memory device 110 may be included in storage device 104 or may be otherwise communicatively coupled to storage device 104. Memory device 110 may be divided into blocks and data may be stored in the blocks in various formats, with the formats being defined by the number of bits that may be stored per memory cell. For example, a single-layer cell (SLC) format may write one bit of information per memory cell, a multi-layer cell (MLC) format may write two bits of information per memory cell, a triple-layer cell (TLC) format may write three bits of information per memory cell, and a quadruple-layer cell (QLC) format may write four bits of information per memory cell, and so on. The blocks in memory device 110 may be hybrid blocks, wherein the blocks may be programmed in multiple formats. For example, a block may be initially programmed as an SLC block and later programmed as a TLC block. Formats storing fewer bits in each cell are more easily accessed, durable, and less error-prone than formats storing more bits per cell. However, formats storing fewer bits in each cell are also more expensive.

To increase the performance of storage device 104, the blocks on memory device 110 may be divided into two pools, a main area pool and a burst pool. For example, if storage device 104 has a one terabyte (TB) capacity, the main area pool may include, for example, one thousand TLC blocks, each of which may store one gigabyte of data, covering the 1 TB capacity of storage device 104. The burst pool which may include additional blocks equal to a percentage of the blocks in the main pool. The blocks in the burst pool may be SLC blocks, some of which may be used for storing host data and some of which may be used for storing control data. For example, the burst pool may include additional SLC blocks equal to five percent of storage device 104 capacity.

The SLC blocks used for storing control data in the burst pool may be assigned to a control pool and may be used by storage device 104 for storing management information that is internal to the operations on storage device 104. For example, the SLC control blocks may store management information that may be used internally on storage device 104 for background operations. Storage device 104 may also use the control blocks to store a logical block address to a physical address mapping in order to map logical addresses received from host 102 to physical block address on memory device 110.

Storing information on blocks, such as TLC blocks, which store more bits of information per memory cell may be a more complex operation than storing information on blocks, such as SLC blocks, which store fewer bits per memory cell. As such, the TLC blocks in the main area pool may be used for sustained write performance. The SLC blocks in the burst pool used for storing host data may be reserved for performance related tasks (for example, peak/burst write performance related tasks) and may be reduced without affecting the overall capacity of storage device 104.

When storage device 104 is newly installed, host writes may be sent to the burst pool as storage device 104 is processing foreground instructions. During background operations, controller 108 may move data from the SLC blocks in the burst pool to the TLC blocks in the main area pool. Overtime as storage device becomes older and the SLC blocks in the burst pool become full, controller 108 may write host data directly to the TLC blocks in the main pool, which may cause the speed of storage device 104 to gradually reduce.

The lifespan of storage device 104 may vary for different types of storage devices. For example, higher-quality storage devices may have higher endurance and a longer lifespan than fallout storage devices. The lifespan of storage device 104 may be the period from when storage device 104 is initially used by host 102 to when storage device 104 enters a read-only mode and can no longer support write operations. Over the lifespan of storage device 104, blocks in the main area pool and/or the burst pool may become faulty and user data may not be written to the faulty blocks. However, the other blocks in the main area pool and/or the burst pool may continue to be used until the number of faulty blocks exceed predefined thresholds.

When an uncorrectable read failure occurs on a control block, the uncorrectable read failure may be considered to be more serious than a block in the main area pool or burst pool becoming faulty. As control blocks may be used to store management tables that are used for the internal operations of storage device 104, an uncorrectable read failure on a control block may prevent storage device 104 from locating and retrieving host data and may force storage device 104 to enter a read-only mode.

When storage device 104 is processing information, if controller 108 determines that an uncorrectable read error has occurred on a control block (referred to herein as a first control block), rather than entering a read-only mode, controller 108 may quarantine the first control block so that the first control block may not be used in future operations. For instance, controller 108 may mark the problematic first control block as a bad block. Controller 108 may relocate retrievable data from the bad first control block into another control block in the control pool. As the control block is involved with an uncorrectable read failure, controller 108 may be unable to read and/or relocate some or all of the data from the bad control block.

Controller 108 may enter a read-only mode and send an asynchronous event notification to host 102. The asynchronous event notification may include the read-only mode reason in a vender specific field. In some cases, when host 102 receives the asynchronous event notification, host 102 may display a message indicating that storage device 104 has entered the read-only mode to a user and may ask if the user wants to format storage device 104 to return storage device 104 to a normal operating mode wherein storage device 104 may perform read and write operations. In other cases, when host 102 receives the asynchronous event notification, host 102 may determine whether storage device 104 should be formatted to return storage device 104 to the normal mode.

Host 102 may send a response to the asynchronous event notification. If based on the user's response or host 102 determination, host 102 sends a response to the asynchronous event notification for controller 108 to recover storage device 104 to operate in a normal mode, storage device 104 may provide a backup option to host 102. For example, if host 102 sends a response for controller 108 to recover storage device 104 and perform read and write operations, controller 108 may send a message asking host 102 if a backup of the data currently stored on storage device 104 is needed. If host 102 does not want to back up the data but wants to recover storage device 104, host 102 may decline the backup option and send a format command to storage device 104.

If host 102 indicates that a backup of the data is needed and provides a location where the data may be backed up, controller 108 may copy the data to the backup location when storage device 104 receives a response from host 102 to back up the data. After storage device 104 backs up the data, it may send an indication to host 102 and host 102 may send instructions to format storage device 104. Controller 108 may format storage device 104 in response to the format instructions received from host 102 and may notify host 102 about the completion of the format operation. The format operation will erase all host data and the corresponding management tables. As the bad first control block was quarantined and marked as bad when the uncorrectable read error occurred, the bad first control block will be excluded from recovered storage device 104, i.e., the first control block will not be used again when the recovered storage device 104 comes back to the normal mode after a successful format operation.

If the response from host 102 instructed controller 108 to back up the host data, as part of recovering storage device 104, controller 108 may copy the backed-up data to memory device 110. As noted, all or some of the control data in the first control block may have been irretrievable. As such, the host data associated with the irretrievable data in the first control block may not be recovered when the corresponding management table in the first control block could not be read correctly, hence resulting in the uncorrectable read error. The recovered storage device 104 may, however, include the host data associated with other control blocks that did not include the uncorrectable read error. Host 102 may notify the user that storage device 104 has been formatted and that storage device may be used for normal host operations.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
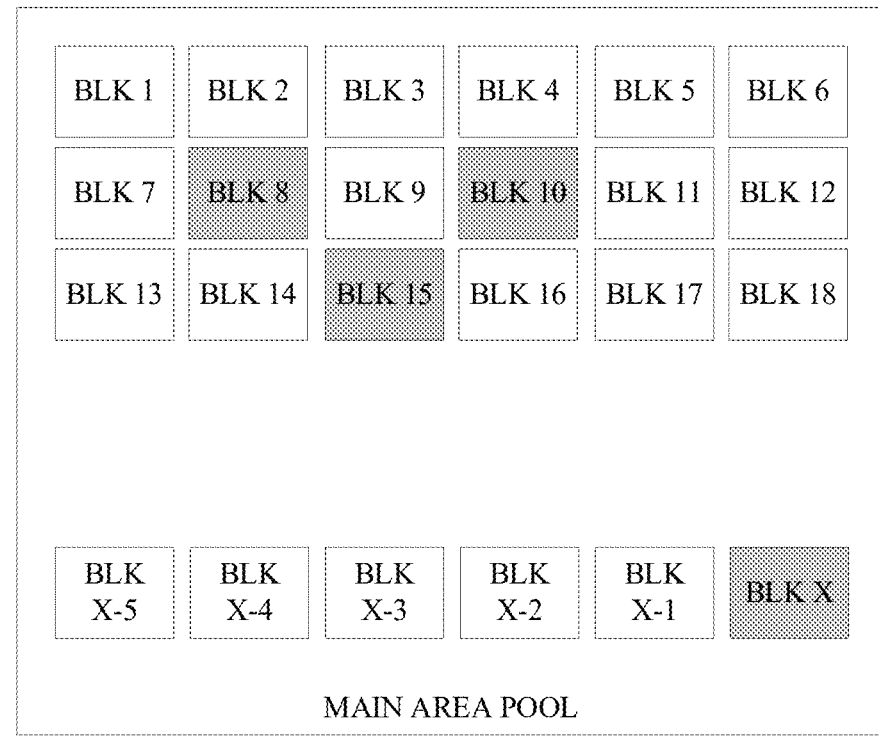
FIG. 2 is a block diagram of pools of blocks in a memory device in accordance with some implementations.
Figure 2:
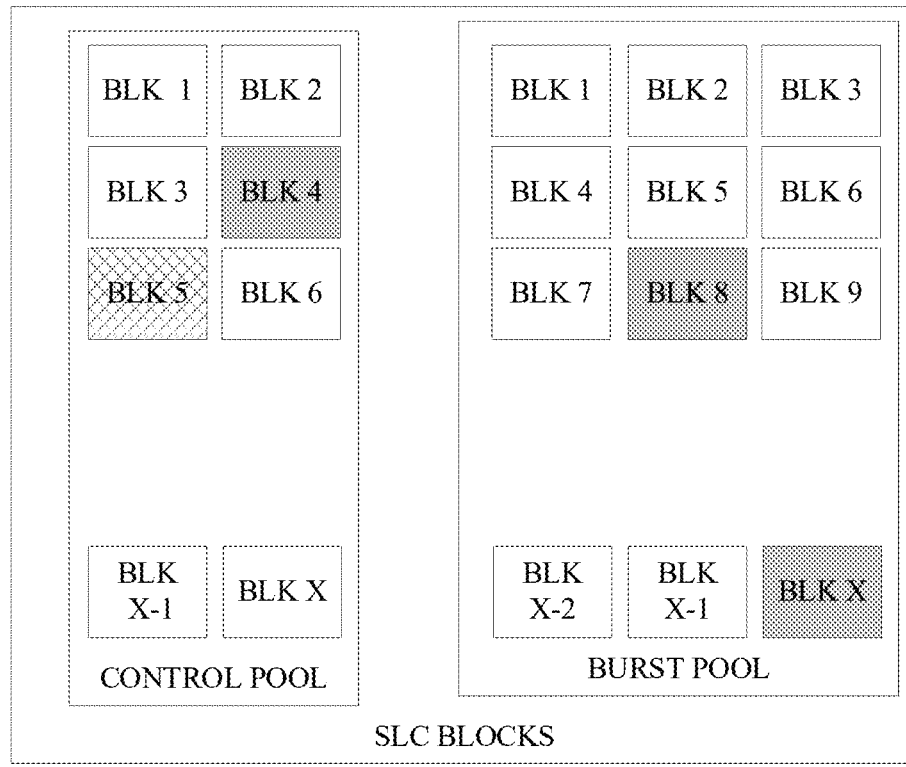

FIG. 2 is a block diagram of pools of blocks in a memory device in accordance with some implementations. Over the lifespan of storage device 104, blocks in the main area pool and/or the burst pool may become faulty and user data may not be written to the faulty blocks. For example, blocks 8, 10, 15, and X in the main area pool, block 4 in the control pool, and blocks 8 and X in the SLC user blocks in the burst pool may represent blocks that have become faulty at a given time and that may no longer be written to. Storage device 104 may retrieve data from these faulty blocks. Storage device 104 may continue to write data to the other blocks in the main area pool and the burst pool until the number of faulty blocks in these pools exceed predefined thresholds.

FIG. 2 also shows an example where when storage device 104 is processing information, controller 108 may detect an uncorrectable read failure on block 5 of the control pool. The uncorrectable read failure on block 5 of the control pool may prevent storage device 104 from locating and retrieving host data and may force storage device 104 to enter a read-only mode. FIG. 2 is provided as an example. Other examples may differ from what is described in FIG. 2.

Figure 3:
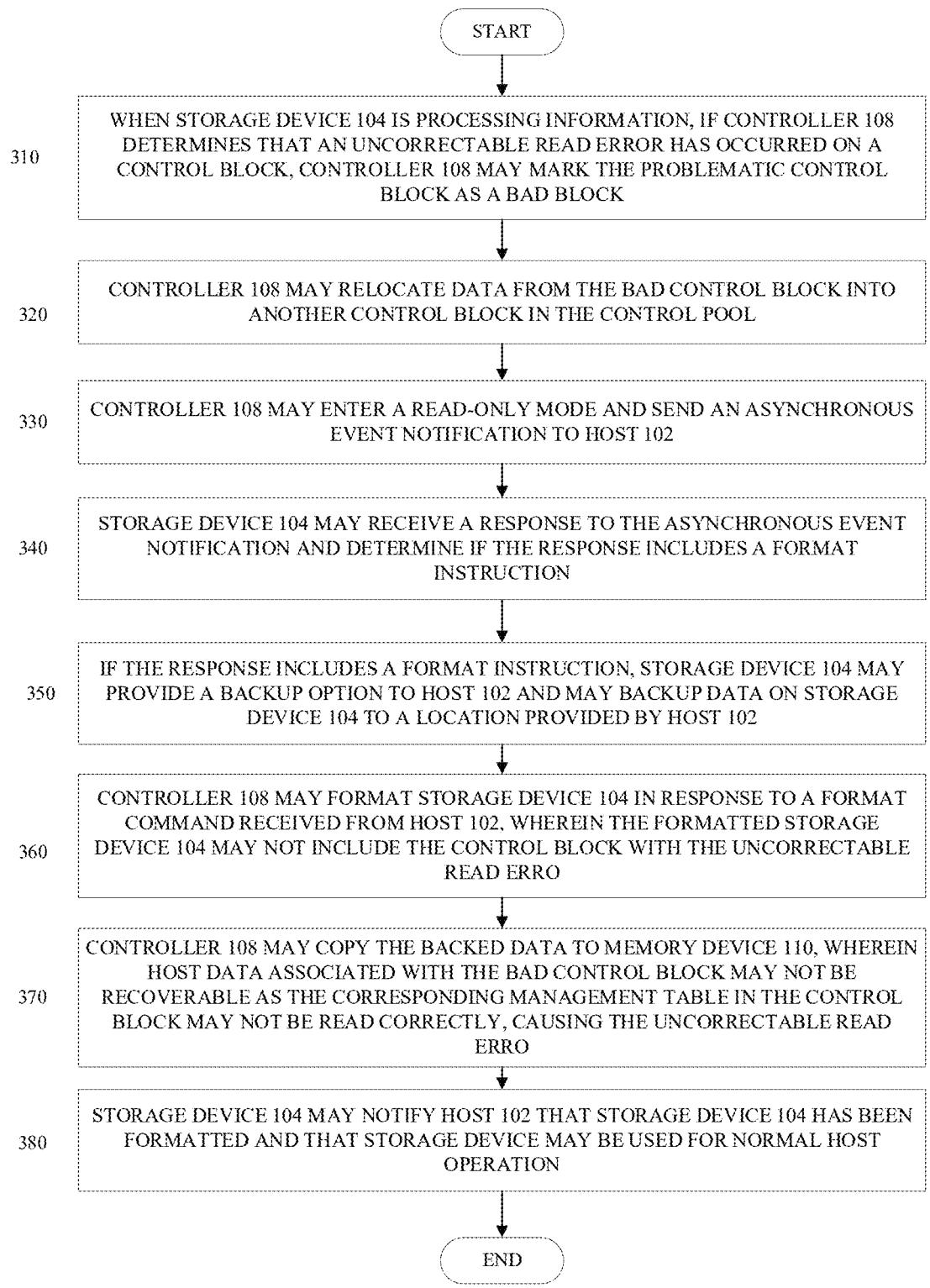
FIG. 3 is an example flow diagram for recovering from an uncorrectable read failure in a control block on a storage device in accordance with some implementations.

FIG. 3 is an example flow diagram for recovering from an uncorrectable read failure in a control block on a storage device in accordance with some implementations. At 310, when storage device 104 is processing information, if controller 108 determines that an uncorrectable read error has occurred on a control block, controller 108 may mark the problematic control block as a bad block. At 320, controller 108 may relocate data from the bad control block into another control block in the control pool. At 330, controller 108 may enter a read-only mode and send an asynchronous event notification to host 102. At 340, storage device 104 may receive a response to the asynchronous event notification and determine if the response includes a format instruction. At 350, if the response includes a format instruction, storage device 104 may provide a backup option to host 102 and may backup data on storage device 104 to a location provided by host 102. At 360, controller 108 may format storage device 104 in response to a format command received from host 102, wherein the formatted storage device 104 may not include the control block with the uncorrectable read error. At 370, controller 108 may copy the backed data to memory device 110, wherein host data associated with the bad control block may not be recovered as the corresponding management table in the control block may not be read correctly, causing the uncorrectable read error. At 380, storage device 104 may notify host 102 that storage device 104 has been formatted and that storage device may be used for normal host operations. FIG. 3 is provided as an example. Other examples may differ from what is described in FIG. 3.

Figure 4:
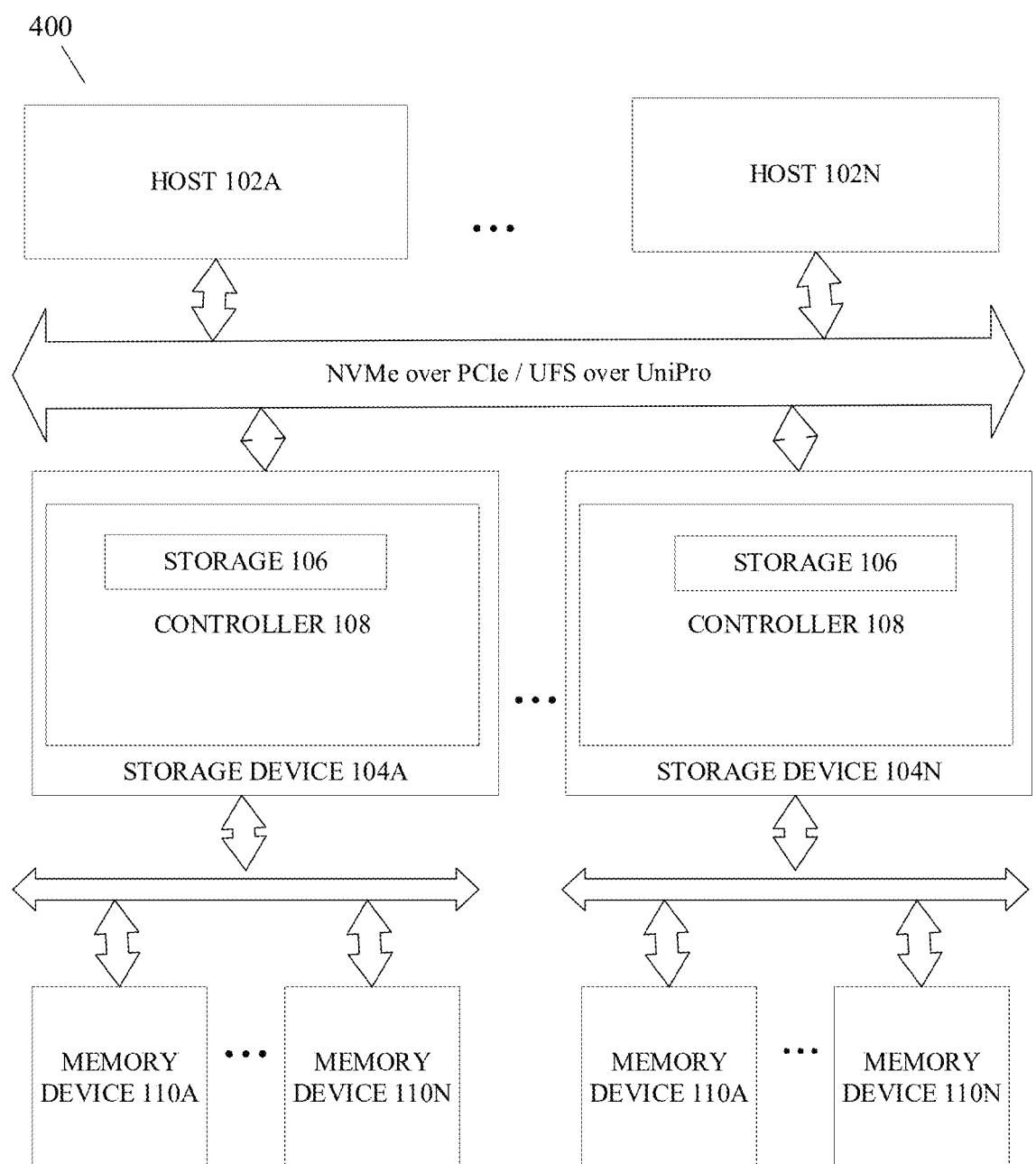
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102n (referred to herein as host(s) 102), and storage devices 104a-104n (referred to herein as storage device(s) 104).

Storage device 104 may include a controller 108 to manage the resources on storage device 104. Controller 108 may recover storage device when an uncorrectable read failure is detected in a control block on storage device 104. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 400 may interconnect via wired connections, wireless connections, or a combination of wired and wireless connections. For example, the network of FIG. 4 may include a cellular network (e.g., a long-term evolution (LTE) network, a code division multiple access (CDMA) network, a 3G network, a 4G network, a 4G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of Environment 400.

Figure 5:
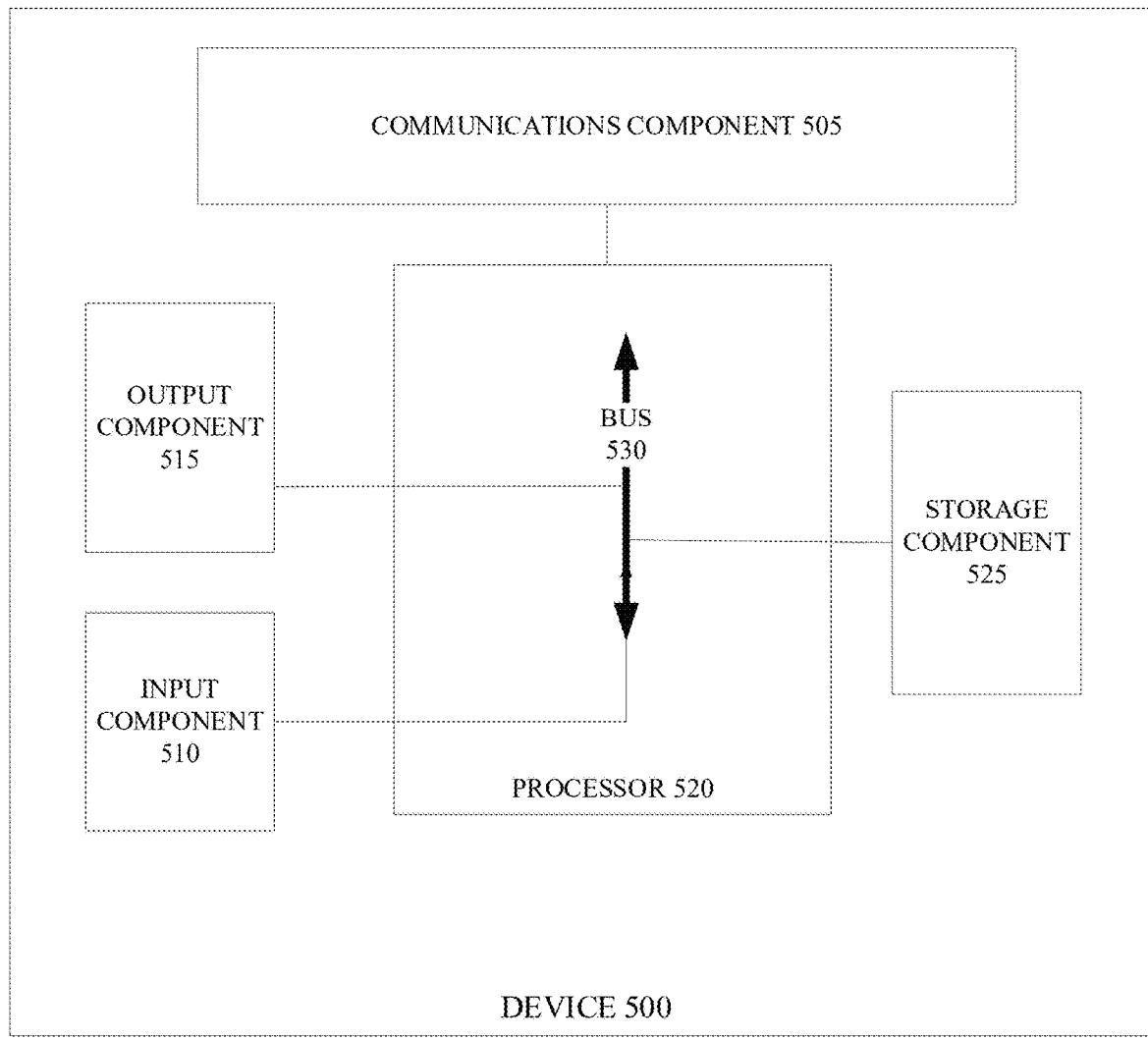
FIG. 5 is a diagram of example components of the host of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, a microphone, and/or a display screen), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and/or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM) 105, read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to recover from an uncorrectable read failure in a control block, the storage device comprises:
    a memory device divided into blocks, wherein the blocks include control blocks for storing control information; and
    a controller to identify when an uncorrectable read failure occurs in a first control block, quarantine the first control block, notify a host device of the uncorrectable read failure, and based on a response from the host device, recover the storage device to operate in a normal mode such that a recovered storage device excludes the first control block from use,
    wherein when the controller notifies the host, the controller enters a read-only mode and sends an asynchronous event notification to the host device.

2. The storage device of claim 1, wherein in quarantining the first control block, the controller marks the first control block as a bad block and relocates data from the first control block to another control block.

3. The storage device of claim 1, wherein the asynchronous event notification includes a read-only mode reason.

4. The storage device of claim 1, wherein in recovering the storage device, the controller provides a backup option to the host device and backs up data on the memory device to the backup option based on instructions from the host device.

5. The storage device of claim 1, wherein in recovering the storage device after formatting the storage device, the controller copies backed up data to the memory device.

6. The storage device of claim 1, wherein the response includes a format command from the host device and in recovering the storage device, the controller formats the storage device.

7. The storage device of claim 1, wherein blocks used for storing host data and covering a write capacity of the storage device are placed in a main area pool, blocks used for storing host data and for peak write operations are placed in a burst pool, and blocks used for storing control information are placed in a control pool.

8. A method for recovering from an uncorrectable read failure in a control block on a storage device, the storage device comprises a controller to execute the method comprising:
    identifying when an uncorrectable read failure occurs in a first control block on a memory device coupled to the storage device;
    quarantining the first control block;
    notifying a host device of the uncorrectable read failure and entering a read-only mode,
    wherein notifying the host comprises sending an asynchronous event notification to the host device; and
    recovering the storage device to operate in a normal mode based on a response from the host device, wherein a recovered storage device excludes the first control block from use.

9. The method of claim 8, wherein quarantining the first control block comprises marking the first control block as a bad block and relocating data from the first control block to another control block.

10. The method of claim 8, further comprising including a read-only mode reason in the asynchronous event notification.

11. The method of claim 8, wherein recovering the storage device comprises providing a backup option to the host device and backing up data on the memory device based on instructions from the host device.

12. The method of claim 8, wherein recovering the storage device comprises copying backed up data to the memory device after formatting the storage device.

13. The method of claim 8, wherein recovering the storage device comprises formatting the storage device.

14. A storage device to recover from an uncorrectable read failure in a control block, the storage device comprises:

a memory device divided into blocks, wherein the blocks include control blocks for storing control information; and a controller to identify when an uncorrectable read failure occurs in a first control block, quarantine the first control block, notify a host device of the uncorrectable read failure, format the storage device to operate in a normal mode based on a response from the host device, wherein a recovered storage device excludes the first control block from use and includes host data associated with control blocks that did not include the uncorrectable read failure, wherein when the controller notifies the host, the controller enters a read-only mode and sends an asynchronous event notification to the host device.

* * * * *